United States Patent
Jerzembeck et al.

(10) Patent No.: US 10,156,196 B2
(45) Date of Patent: Dec. 18, 2018

(54) METHOD FOR REGENERATING A DIESEL PARTICULATE FILTER

(71) Applicant: Deutz Aktiengesellschaft, Cologne (DE)

(72) Inventors: Sven Jerzembeck, Hamburg (DE); Abderrahim Qriqra, Cologne (DE); Holger Zimmermann, Cologne (DE); Peter Heidkamp, Bergisch-Gladbach (DE)

(73) Assignee: DEUTZ Aktiengesellschaft, Cologne (DE)

( * ) Notice: Subject to any disclaimer, the term of this patent is extended or adjusted under 35 U.S.C. 154(b) by 0 days.

(21) Appl. No.: 14/646,257

(22) PCT Filed: Nov. 2, 2013

(86) PCT No.: PCT/EP2013/003295
§ 371 (c)(1),
(2) Date: May 20, 2015

(87) PCT Pub. No.: WO2014/079535
PCT Pub. Date: May 30, 2014

(65) Prior Publication Data
US 2015/0292426 A1 Oct. 15, 2015

(30) Foreign Application Priority Data
Nov. 21, 2012 (DE) .................. 10 2012 022 712

(51) Int. Cl.
*F01N 3/00* (2006.01)
*F02D 41/02* (2006.01)
(Continued)

(52) U.S. Cl.
CPC .......... *F02D 41/029* (2013.01); *F02D 11/105* (2013.01); *F02D 41/0002* (2013.01);
(Continued)

(58) Field of Classification Search
None
See application file for complete search history.

(56) References Cited

U.S. PATENT DOCUMENTS

| 5,343,702 | A | 9/1994 | Miyajima et al. |
| 6,865,885 | B2 * | 3/2005 | Kitahara ............... F01N 3/023 60/274 |

(Continued)

FOREIGN PATENT DOCUMENTS

| DE | 19717805 | 10/1998 |
| DE | 10259052 | 4/2004 |

(Continued)

*Primary Examiner* — Phutthiwat Wongwian
*Assistant Examiner* — Diem Tran
(74) *Attorney, Agent, or Firm* — Davidson, Davidson & Kappel, LLC

(57) ABSTRACT

A reciprocating internal combustion engine with an emission control device and a method for operating same are described. At least one throttle, arranged on the intake side, at least one main fuel injection nozzle for feeding a main fuel to a combustion chamber of the diesel engine, and at least one catalytic converter are arranged in the center of an exhaust gas passage for conducting exhaust gas out of the combustion chamber, and at least one control device is used. A soot burn-off rate determined according to a model approach is maximized using a regulation process by means of a throttle valve.

17 Claims, 4 Drawing Sheets

(51) Int. Cl.
 *F02D 11/10* (2006.01)
 *F02D 41/00* (2006.01)
 *F02D 41/14* (2006.01)
 *F02D 41/40* (2006.01)

(52) U.S. Cl.
 CPC ....... *F02D 41/025* (2013.01); *F02D 41/0245* (2013.01); *F02D 41/1454* (2013.01); *F02D 41/405* (2013.01); *F02D 2011/102* (2013.01); *F02D 2041/1433* (2013.01); *F02D 2200/0802* (2013.01); *F02D 2200/0812* (2013.01); *Y02T 10/26* (2013.01); *Y02T 10/42* (2013.01)

(56) References Cited

U.S. PATENT DOCUMENTS

| | | | |
|---|---|---|---|
| 6,968,732 B2 * | 11/2005 | Nakoji | F02M 25/0809 73/114.38 |
| 7,155,899 B2 | 1/2007 | Beer et al. | |
| 7,178,327 B2 | 2/2007 | Miyashita | |
| 7,246,595 B1 * | 7/2007 | Hoare | F01N 13/011 123/294 |
| 2003/0033800 A1 * | 2/2003 | Tonetti | F02D 41/027 60/286 |
| 2005/0086933 A1 * | 4/2005 | Nieuwstadt | F01N 3/0842 60/297 |
| 2005/0257771 A1 | 11/2005 | Nakayama et al. | |
| 2006/0005534 A1 | 1/2006 | Wirth et al. | |
| 2006/0096572 A1 | 5/2006 | Satou et al. | |
| 2006/0130465 A1 * | 6/2006 | Sun | F01N 3/0231 60/295 |
| 2008/0276604 A1 * | 11/2008 | Hosaka | F01N 3/0231 60/295 |
| 2011/0047982 A1 | 3/2011 | Chen et al. | |

FOREIGN PATENT DOCUMENTS

| | | |
|---|---|---|
| DE | 102007053130 | 5/2009 |
| EP | 0272619 | 6/1988 |
| EP | 488386 | 6/1992 |
| EP | 1 384 868 | 1/2004 |
| EP | 1531249 | 5/2005 |
| EP | 1 669 574 | 6/2006 |
| WO | WO 9922129 | 5/1999 |
| WO | WO 2010/007282 | 1/2010 |

* cited by examiner

METHOD FOR REGENERATING A DIESEL PARTICULATE FILTER

BACKGROUND

An exhaust gas system for a diesel engine is known from EP 488 386 B1.

Likewise, an internal combustion engine including an exhaust gas system became known from DE 10 2007 053 130, in which case an additional vaporizer is used.

Moreover, a method is known from WO 9922129 for operating a piston-type internal combustion engine including a direct fuel injection system and an exhaust aftertreatment device.

It is disadvantageous here, for example in the variant having the additional vaporizer, that additional elements, which can malfunction, are necessary, which generate additional costs.

SUMMARY OF THE INVENTION

It is an object of the present invention to provide a device and a method which eliminate the above-mentioned disadvantages and also to develop a strategy to obtain maximum particulate matter burn-off rates in the diesel particulate filter.

The object is achieved by the combination of the throttle valve optimization:

The new approach allows the maximization of the so-called burn-off rate of particulate matter in the diesel particulate filter instead of maximizing the temperature upstream from the diesel particulate filter as previously. Intake-side throttling effectuates on the one hand an exhaust gas temperature increase, and on the other hand a reduction of the residual oxygen proportion in the exhaust gas due to lack of air (in comparison to the unthrottled case) during combustion. Due to the new approach, it would be possible to optimize the burn-off rate in the diesel particulate filter ("DPF") in a certain throttle valve adjustment range and to minimize the time for the service regeneration. It should be possible to optimize the throttle valve setting to a maximum particulate matter burn-off rate by using the approach described. This is a physical predictive model maximization of the soot burn-off rate with the aid of regulation via a throttle valve.

The second approach allows a targeted regulation of the engine by using a fuel unburned post injection (if an oxidation catalytic converter is present) in such a way that a service regeneration is successfully concluded after 30 minutes. The advantage would be the adjustment of the system to environmental conditions and poorly insulated exhaust gas systems, for example exhaust gas lines from the engine turbine to the exhaust aftertreatment system.

The fuel is injected torque neutrally during the expansion stroke. Under ideal conditions, the fuel is injected after the combustion stroke, vaporized, and provided after the exhaust stroke to the DOC as an oxidizer in order to increase the exhaust gas temperature due to the exothermic reaction process. Fuel is torque neutrally injected during the exhaust stroke (expansion stroke).

Using the plausibility examinations depicted in the following, it is possible to adjust the exhaust gas oxygen content and the DPF temperature into a range in such a way that a service regeneration is enabled in all environmental boundary conditions or in exhaust aftertreatment systems which are not optimally insulated.

As preparation for carrying out a service regeneration, the vehicle is operated at a stationary rotational speed and a corresponding base load suitable to the hydraulic power unit. In the first step, injection parameters (pilot injection, main injection, and post injection timing and pilot and post injection amounts and rail pressure) are adjusted in such a way that the efficiency of the engine declines and thus the exhaust gas temperature is increased. In the second step, the intake—side throttle valve is regulated to a minimum pressure in the charge air pipe to further degrade the efficiency and thus to further increase the exhaust gas temperature of the engine. The throttle valve emerges as the dominant temperature increase effect for increasing the exhaust gas temperature in comparison to adjusting the injection parameters. It is thus possible to maximize the exhaust gas temperature by throttling the throttle valve within a possible and safe operation of the engine. The intended maximized temperature range upstream from the diesel particulate filter lies between 550° C. and 620° C. in order to reduce the global DPF load from 4 g/l to below 1 g/l in the diesel particulate filter within 30 minutes.

For certain applications using diesel particulate filters, it may result, under certain circumstances, that the soot or particulate filter load exceeds a critical load limit. A possible counter measure to reduce a filter load which is too high to an acceptable level, in order to allow a normal driving operation, is on the one hand an engine operation at high stationary engine output or, if this is not possible, a so-called service regeneration. During this service regeneration, the vehicle is not operational. With regard to the proposed approach the device is operated at a stationary working rotational speed and at a base load. The base load is dependent on the specific hydraulic power unit of the vehicle flange-mounted to the diesel engine. Injection parameters and a throttle valve (downstream from the charge air cooler, ITV=intake throttle valve) are parameterized during a service regeneration in such a way that the exhaust gas temperature is maximized downstream from the turbine or upstream from the diesel particulate filter. Due to the "high" exhaust gas temperatures and the residual oxygen in the exhaust gas, soot or solid particulates are oxidized in the diesel particulate filter and the filter load is thus reduced. The underlying mechanism for reducing the soot in the diesel particulate filter is designated as "active regeneration" in this case, i.e. soot is oxidized exclusively using residual oxygen in the exhaust gas at temperatures above 500° C. The duration of a service regeneration is measured in a time-controlled manner in order to reduce the DPF load to a lower load threshold.

DETAILED DESCRIPTION

Figure 1:
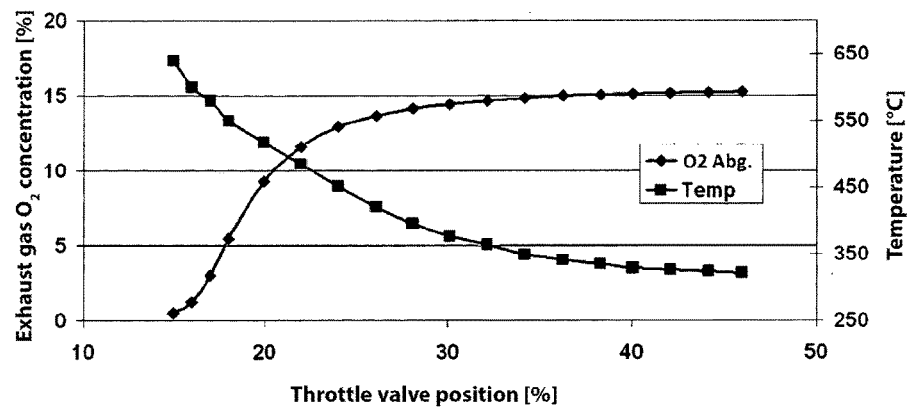
FIG. 1: Dependency of the temperature and oxygen concentration in the exhaust gas upstream from the DPF as a function of the throttle valve position.

FIG. 1 illustrates by way of example a temperature and residual oxygen concentration progression in the exhaust gas as a function of the throttle valve position at a constant speed and load driven by the engine. Using a throttle valve position which becomes smaller (the throttle valve closes), it is apparent that the temperature increases and the concentration of oxygen in the exhaust gas analogously drops.

The DPF temperature, the residual oxygen concentration in the exhaust gas, and also the particulate load are exclusively significant for the quantification of the particulate burn-off rate during an active regeneration. Using a phenomenological model approach developed by us, see Equations 1 and 2, the above statement could be numerically and experimentally confirmed. In addition, it could be shown that the phenomenological approach, independent of DPF geometry and cell density substrate, achieves very good results in comparison with experimental results. The burn-off rate is given according to Equations 1 and 2 as:

$$\frac{dm_{soot}}{dt} = m_{soot} \cdot [O_2]^{0.96} \cdot f(T) \text{ with} \quad (1)$$

$$f(T) = (T-a) \cdot e^{(T-b)-c+d) \cdot 10^{-5}} \quad (2)$$

where [O2] is the oxygen concentration and f(T) is a temperature term, msoot is the DPF load at a specific point in time t, and a, b, c, and d correspond to calibration parameters. Under the premise that the oxygen concentration [O2] and also the temperature T in the diesel particulate filter (DPF) may be regarded as constants, the standardized burn-off rate dmsoot/dt/msoot likewise describes a constant, see equation 3.

$$\frac{dm_{soot}}{dt} / m_{soot} \bigg|_{T[O_2]=const} = [O_2]^{0.96} \cdot f(T) = const \quad (3)$$

Under these assumptions, Equation 4 describes the resolution of the differential equation of Equation 1, where m0 corresponds to the DPF load at point in time t=0 (start of the service generation). Under the assumption that the particulate mass flow emitted by the engine into the DPF may be assumed to be negligibly small in comparison to the burn-off rate, Equation 4 describes the DPF particulate load for an arbitrary point in time t.

$$m_{soot}(t) = m_0 e^{-t \cdot [O_2]^{0.96} \cdot f(T)} \quad (4)$$

By solving Equation 4 for time t, a time criterion may be defined for the DPF burn-off, which depends exclusively on the start DPF load m0=msoot (t=0), the end load msoot(t), the DPF temperature T, and the exhaust gas oxygen concentration [O2].

$$t = \frac{\ln\left(\frac{m_0}{m_{soot}(t=30\ min)}\right)}{\cdot [O_2]^{0.96} \cdot f(T)} \bigg|_{t[O_2]=const} \quad (5)$$

Throttle Valve Optimization

Figure 2:
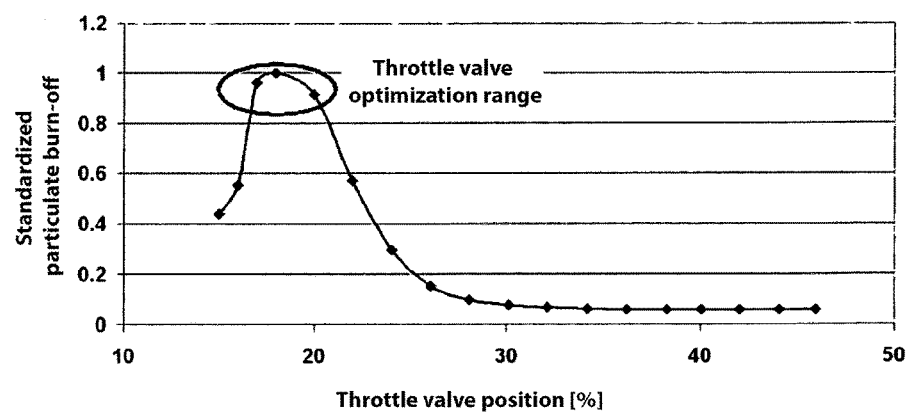
FIG. 2: Standardized particulate oxidation rate.

FIG. 2 illustrates the standardized particulate burn-off rate as a function of the throttle valve setting according to Equation 3 (which corresponds to the DPF temperatures and exhaust gas oxygen concentrations from FIG. 1). It is apparent from the figure that the curve progression allows a maximum and thus a range for setting an optimal throttle valve position.

Figure 3:
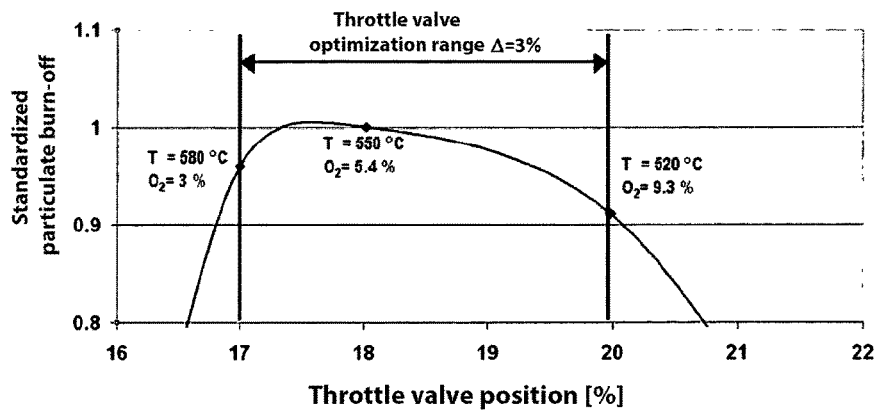
FIG. 3: Standardized particulate oxidation rate of the optimization range.

FIG. 3 represents this throttle valve optimization range (approximately 17% to 20% throttle valve set position) in an enlarged view. It is clear from the figure that an optimum burn-off rate is found in a temperature range from 520° C. to 580° C. and at an oxygen concentration of 3% to 9.3%.

Figure 4:
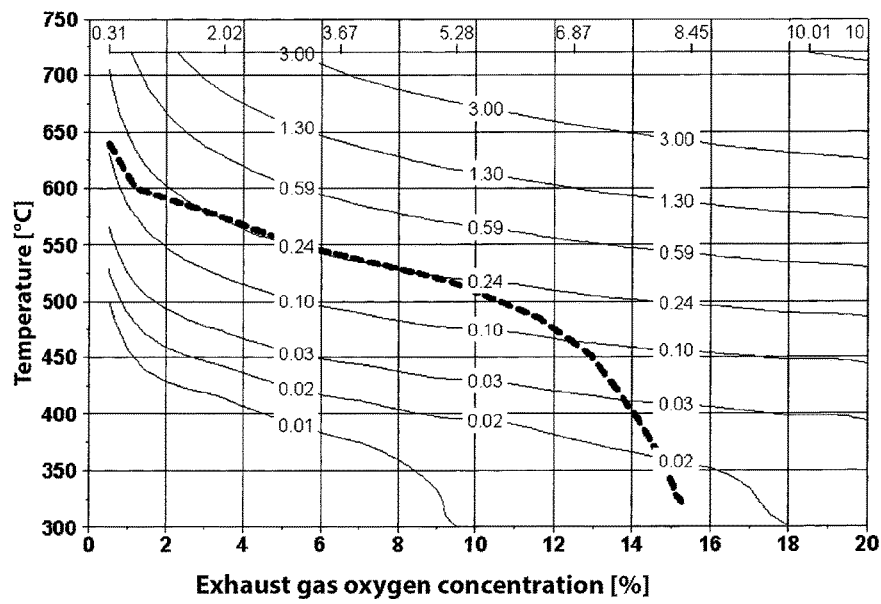
FIG. 4: Standardized particulate oxidation rate, throttle characteristic curve for exhaust gas oxygen concentration and DPF temperature and throttle valve optimization range.

FIG. 4 represents the standardized particulate burn-off across the DPF temperature and the exhaust gas oxygen concentration according to Equation 3. It should be kept in mind here that the depicted lines of identical burn-off rates are scaled to a reference point ([O2]=10% and T=600° C.). For example, the relative burn-off speed at an oxygen concentration of 5% and a temperature of 400° C. is approximately 100 times as long as at the reference point. This approach enables the definition of a relative burn-off rate (burn-off speed) as a function of the oxygen concentration and the temperature.

In addition, the DPF temperature and the exhaust gas oxygen concentration dependency corresponding to the results from FIG. 1 are to be deduced from the image of the throttle characteristic curve. During closing of the throttle valve, the curve describes the quasi-stationary temperature and residual oxygen concentration progression in the diagram. A visual analogy of the optimization presented in FIGS. 2 and 3 may be formulated as follows. If one hikes along the yellow line in FIG. 4 at the throttle valve position of 46% (see FIG. 4) from right to left in the direction of the throttle valve position of 15%, and considers the depicted standardized burn-off rates as a mountain, then one finds the optimum for the throttle valve position exactly at the point where one no longer clambers up the mountain at the first step, but where the mountain "descends."

Plausibility Check

Figure 5:
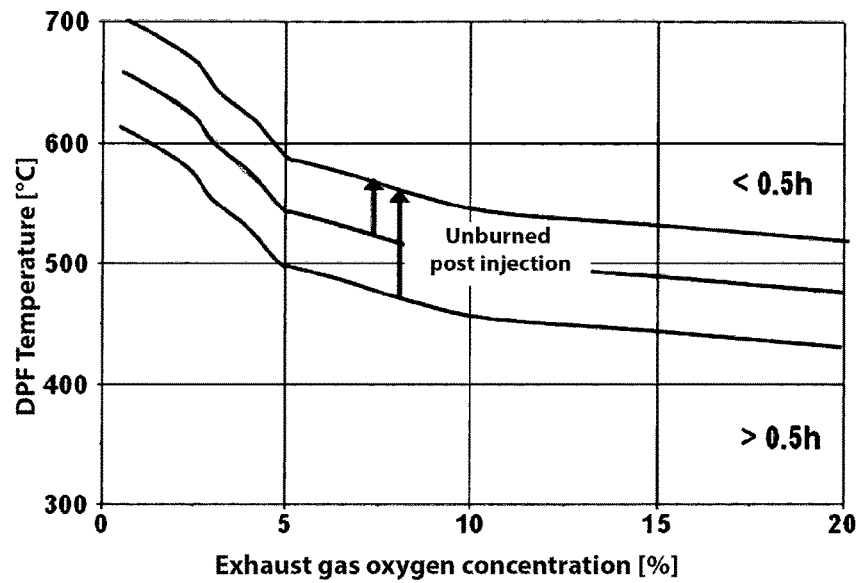
FIG. 5: Service regeneration including a throttle characteristic curve for temperatures and oxygen concentrations.
Figure 6:
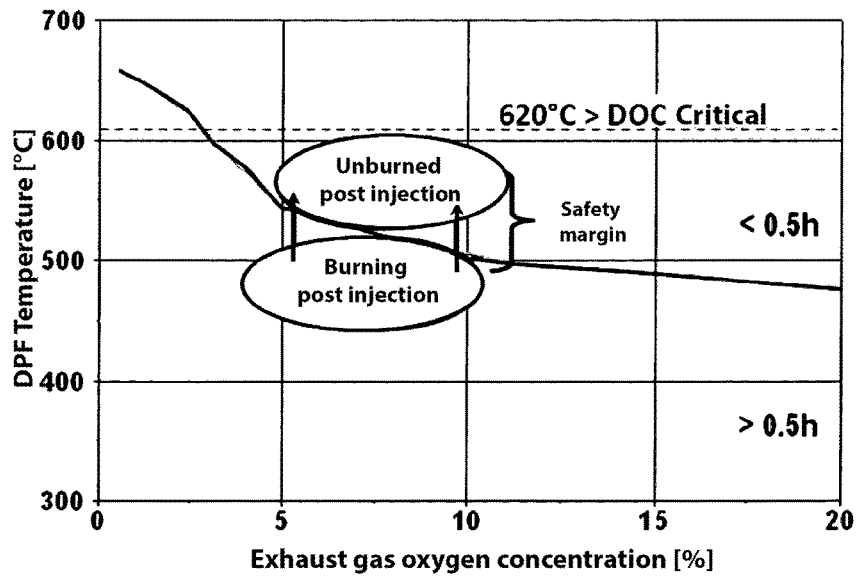
FIG. 6: Service regeneration including a throttle characteristic curve for temperatures and oxygen concentrations.

In order to define a time-related criterion as a function of the DPF temperature and the exhaust gas oxygen concentration, in which a DPF service regeneration may be defined as successful or as unsuccessful, the following method is used. For example, 4 g/l as a maximum acceptable DPF load (soot per volume unit) and <1 g/l as the DPF regeneration target value are required. With the aid of equation 5, the corresponding burn-off times are calculated for DPF temperatures from 300° C. to 620° C. and exhaust gas oxygen concentrations of 0.5% to 20%. The calculated results are shown in FIGS. 5 and 6. The range, in which the DPF burn-off (from 4 g/l to 1 g/l) lasts <30 minutes, is highlighted in green, and the red area lasts >30 minutes. Accordingly, a "hard" boundary for DPF temperature and exhaust gas oxygen concentration may be described, in which a service regeneration must proceed. FIGS. 3 and 4 illustrate the throttle valve characteristic curve of DPF temperature and exhaust gas oxygen concentration. It is conspicuous that the yellow throttle valve line cuts through the green area at a very small distance from the red area. At lower ambient temperatures, or a poorly insulated exhaust aftertreatment system, the temperature drops, which is depicted by the dashed yellow line. In this case, the service regeneration may not be successfully carried out within 30 minutes, because no intersection exists with the green area. A controlled, not burning post injection, which increases the temperature in the DOC due to exothermic HC oxidation in the oxidation catalytic converter, offers a resolution here. This is illustrated in FIG. 5. In this case, it is possible to successfully conclude the service regeneration within the desired time frame. The present invention is thus a procedure for operating a piston-type internal combustion engine, in particular an auto-ignition piston-type internal combustion engine, in which the exhaust gases exiting from the cylinders are conducted through at least one mechanically, chemically, and/or catalytically functioning exhaust treatment device, which regenerates in operating-dependent time intervals, for the removal of pollutants and in which, with the aid of an injection nozzle, a first and at least one further fuel amount is directly injected into the individual cylinders for the respective combustion stroke at successive time intervals, the amount of fuel and/or the time interval of which is predefined by an engine control, at least one of the fuel amounts being injected in relation to the injection point in time and the amount necessary for the combustion stroke is a function of the load demand, and the further fuel amount being injected when the piston is located in a predefinable area of the bottom dead center position during the expansion stroke.

FIG. 6 illustrates the general procedure for determining the necessary DPF temperature and exhaust gas oxygen concentration. In step one, the engine is calibrated in such a way that it approaches the range "no unburnt post injection." In the second step, the post injection amount is increased to the extent that a temperature increase is enabled in the range "unburnt post injection" and thus the service regeneration may be successfully carried out. To thereby protect the oxidation catalytic converter, the temperature should not exceed 620° C.

Figure 7:
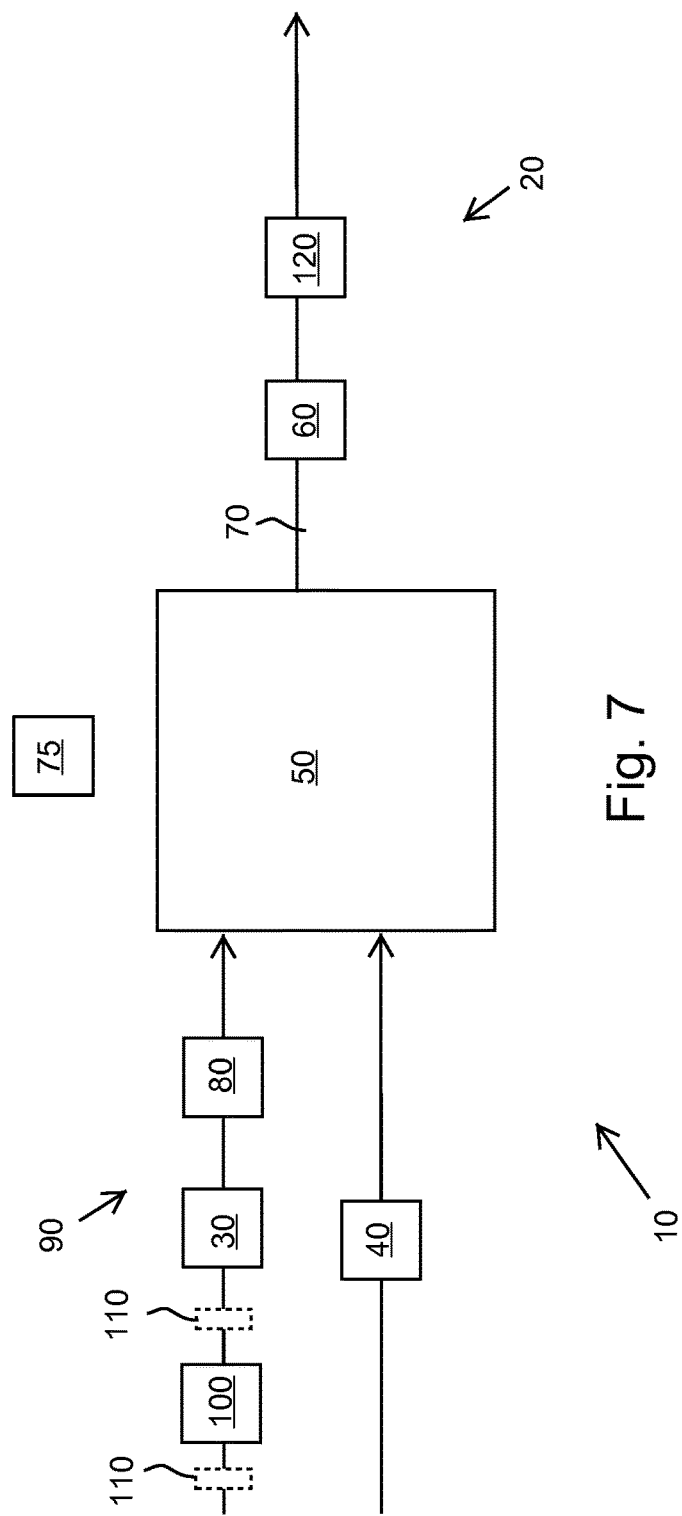
FIG. 7: An embodiment of the engine according to the invention.

FIG. 7 schematically shows s piston-type internal combustion engine 10 including an exhaust treatment device 20 having at least one throttle 30 situated on the intake side, at least one main fuel injection nozzle 40 for feeding a main fuel to a combustion chamber 50 of the diesel engine, a catalytic converter 60 situated in the center of an exhaust gas passage 70 for conducting exhaust gas out of the combustion chamber 50, and at least one control device 75. Engine 10 has an HC feed device 80 for feeding HC (hydrocarbon), the HC feed device being situated in the center of an inlet system 90 for feeding air to the combustion chamber 50. Engine 10 has at least one air supply unit 100 and/or an airflow sensor 110. Engine 10 has a diesel particulate filter and/or an oxidation catalytic converter 120. As shown schematically, airflow sensor 110 is situated upstream from the air supply unit 100 in the flow direction of the air or airflow sensor 110 is situated downstream from the air supply unit 100 in the flow direction of the air.

What is claimed is:

1. A piston-type internal combustion engine including an exhaust gas treater, the engine comprising:
   at least one throttle situated on an intake side of the engine;
   at least one main fuel injection nozzle for feeding a main fuel to a combustion chamber of the engine;
   a catalytic converter situated in the center of an exhaust gas passage for conducting exhaust gas out of the combustion chamber;
   a diesel particulate filter downstream of the engine; and
   at least one controller configured for controlling the at least one throttle to adjust a temperature of the exhaust gas and the residual concentration of oxygen in the exhaust gas using a quantification of a burn-off rate of a particulate load of the diesel particulate filter calculated exclusively from the diesel particulate filter temperature, the residual concentration of oxygen in the exhaust gas, the particulate load and calibration parameters.

2. The piston-type internal combustion engine as recited in claim 1 further comprising a hydrocarbon feeder for feeding hydrocarbon, the hydrocarbon feeder being situated in the center of an inlet system for feeding air to the combustion chamber.

3. The piston-type internal combustion engine as recited in claim 1 further comprising at least one of an air supplier and an airflow sensor.

4. The piston-type internal combustion engine as recited in claim 1 further comprising an oxidation catalytic converter.

5. The piston-type internal combustion engine as recited in claim 1 wherein the main fuel is a gaseous or liquid fuel.

6. The piston-type internal combustion engine as recited in claim 1 wherein a vaporizer liquid is a liquid fuel or another liquid.

7. The piston-type internal combustion engine as recited in claim 1 further comprising an air supplier connected to the controller with the aid of a line for data exchange.

8. The piston-type internal combustion engine as recited in claim 1 further comprising an airflow sensor and an air supplier, the airflow sensor being situated upstream from the air supplier in the flow direction of the air.

9. The piston-type internal combustion engine as recited in claim 1 further comprising an airflow sensor and an air supplier, the airflow sensor being situated downstream from the air supplier in the flow direction of the air.

10. A method for operating the piston-type internal combustion engine recited in claim 1, the method comprising:
    controlling, by the controller, the at least one throttle to increase a temperature of the exhaust gas using a physical predictive model for maximizing a soot burn-off rate for a diesel particulate filter during regeneration.

11. The piston-type internal combustion engine as recited in claim 1 wherein the at least one controller is configured for controlling the at least one throttle based on a burn-off rate calculated using the following equations:

$$\frac{dm_{soot}}{dt} = m_{soot} \cdot [O_2]^{0.96} \cdot f(T)$$

$$f(T) = (T-a) \cdot e^{(T-b)-c+d) \cdot 10^{-5}}$$

where [O2] is the oxygen concentration,
T is a temperature in the diesel particulate filter,
f(T) is a temperature term,
$m_{soot}$ is the DPF load at a specific point in time t, and
a, b, c, and d correspond to calibration parameters.

12. The piston-type internal combustion engine as recited in claim 11 wherein the specified time frame is calculated using the following equation:
    where $m_0 = msoot$ (t=0).

13. The piston-type internal combustion engine as recited in claim 1 wherein the at least one controller is configured for controlling the at least one throttle to increase the temperature of the exhaust gas to a value in a range of from 520° C. to 580° C.

14. The piston-type internal combustion engine as recited in claim 1 wherein the at least one controller is configured for controlling the at least one throttle to decrease the concentration of oxygen in the exhaust gas to a value in a range of 3% to 9.3%.

15. The piston-type internal combustion engine as recited in claim 1 wherein the at least one controller is configured for controlling the at least one throttle to increase the temperature of the exhaust gas to a value in a range of from 520° C. to 580° C. and to decrease the concentration of oxygen in the exhaust gas to a value in a range of 3% to 9.3%.

16. The piston-type internal combustion engine as recited in claim 1 wherein the at least one controller configured for controlling the at least one throttle to 17% to 20% throttle valve set position to burn-off the particulate load in the specified time frame.

17. A piston-type internal combustion engine including an exhaust gas treater, the engine comprising:
- at least one throttle situated on an intake side of the engine;
- at least one main fuel injection nozzle for feeding a main fuel to a combustion chamber of the engine;
- a catalytic converter situated in the center of an exhaust gas passage for conducting exhaust gas out of the combustion chamber;
- a diesel particulate filter downstream of the engine; and
- at least one controller configured for controlling the at least one throttle to adjust a temperature of the exhaust gas and the residual concentration of oxygen in the exhaust gas, the at least one controller being configured for controlling the at least one throttle based on a burn-off rate of a particulate load of the diesel particulate filter calculated exclusively using the residual concentration of oxygen, a temperature in the diesel particulate filter, a temperature term, a load of the diesel particulate filter at a specific point in time and calibration parameters.

* * * * *